United States Patent [19]

Meyer et al.

[11] Patent Number: 6,118,816

[45] Date of Patent: Sep. 12, 2000

[54] DIGITAL TRANSMISSION SYSTEM WITH A TRELLIS-BASED, REDUCED-STATE ESTIMATION METHOD

[75] Inventors: Raimund Meyer, Nürnberg; Stefan Müller, Erlangen; Wolfgang Gerstacker, Nürnberg; Johannes Huber, Langensendelbach, all of Germany

[73] Assignee: U.S. Philips Corporation, New York, N.Y.

[21] Appl. No.: 08/968,955

[22] Filed: Nov. 12, 1997

[30] Foreign Application Priority Data

Nov. 18, 1996 [DE] Germany .................... 196 47 653

[51] Int. Cl.[7] ............................. H03H 7/30; H03H 7/40
[52] U.S. Cl. .................................. 375/233; 375/343
[58] Field of Search ........................... 375/340, 200, 375/233, 262, 229; 714/792

[56] References Cited

U.S. PATENT DOCUMENTS

| | | | |
|---|---|---|---|
| 4,730,343 | 3/1988 | Kanemsa et al. ............ | 375/233 |
| 4,985,902 | 1/1991 | Gurcan ..................... | 375/233 |
| 5,282,225 | 1/1994 | Nikias et al. .............. | 375/232 |
| 5,303,263 | 4/1994 | Shoji et al. ............... | 375/229 |
| 5,307,374 | 4/1994 | Baier ...................... | 375/229 |
| 5,406,570 | 4/1995 | Berrou et al. ............. | 714/792 |
| 5,406,585 | 4/1995 | Rohani et al. ............. | 375/341 |
| 5,425,037 | 6/1995 | Uesugi et al. ............. | 714/794 |
| 5,432,820 | 7/1995 | Sugawara et al. .......... | 375/341 |
| 5,434,886 | 7/1995 | Kazawa et al. ............ | 375/262 |
| 5,436,932 | 7/1995 | Sogo et al. ............... | 375/341 |
| 5,450,453 | 9/1995 | Frank ...................... | 375/200 |
| 5,461,644 | 10/1995 | Bergmans et al. .......... | 375/341 |
| 5,537,443 | 7/1996 | Yoshino et al. ............ | 375/340 |
| 5,594,756 | 1/1997 | Sakurai et al. ............ | 375/233 |

OTHER PUBLICATIONS

By Jianjun Wu et al. "A New Adaptive Equalizer with Channel Estimator for Mobile Radio Communication" IEEE Transactions on Vehicular Technology, Bd. 45, Nr. 3, Aug. 1996, pp. 467–474.

By Muller, S. H. et al. "Reduced–State Sort–Output Trellis–Equalization Incorporating Soft Feedback" IEEE Globecom 1996. Communications: The Key to Global Prosperity. Conference Record., 18. –22. Nov. 1996, pp. 95–100.

"Maximum likelihood sequence estimation of digital sequences in the presence of intersymbol interference", by G.D> Forney, IEEE Transactions on Information Theory, vol. IT–18, 1972, pp. 363–378.

*Primary Examiner*—Stephen Chin
*Assistant Examiner*—Thomas E McKiernan
*Attorney, Agent, or Firm*—Dicran Halajian

[57] ABSTRACT

The invention relates to a digital transmission system comprising a receiver, in which system a trellis-based estimation method (3) with a number of states reduced as a result of feedback (5) of at least one feedback value ($\xi$) forms estimates ($\hat{a}$) for a received signal (r) by means of an estimated impulse response ($\hat{h}$) of a transmission system (1), a feedback value ($\xi$) being determined from at least one estimate ($\hat{a}$). With reduced-state estimation methods for the digital transmission, the problem consists of the additional noise components caused by the feedback of preliminary false symbol decisions. To achieve optimum estimates ($\hat{a}$) for the received signal (r) despite a reduced number of states due to feedback, the receiver forms the feedback value ($\xi$) from at least one intermediate value ($\hat{a}_{SDF}$). In digital transmission systems, the transmit symbols (a) and the estimates ($\hat{a}$) have the values –1 or 1 in the receiver. In the receiver according to the invention, intermediate values ($\hat{a}_{SDF}$) having a value in the range from –1 to 1 can be fed back, so that a better feedback value ($\xi$) and thus better estimates ($\hat{a}$) for the received signal (r) may be achieved.

5 Claims, 3 Drawing Sheets

DIGITAL TRANSMISSION SYSTEM WITH A TRELLIS-BASED, REDUCED-STATE ESTIMATION METHOD

BACKGROUND OF THE INVENTION

The invention relates to a digital transmission system comprising a receiver, in which system a trellis-based estimation method with a number of states reduced as a result of feedback of at least one feedback value forms estimates for received symbols by means of an estimated impulse response of a transmission system, a feedback value being determined from at least one estimate.

Furthermore, the invention relates to a receiver and a method of receiving a digital signal.

The subject of the invention is determined for digital transmission systems, for example, digital mobile radio systems such as the GSM system or digital Continuous Phase Modulation (CPM) radio relay systems in which trellis-based estimation methods are used which may be used both for equalizing a transmission channel and for decoding other trellis-coded signals (such as, for example, CPM signals).

When digital transmission takes place over dispersive channels, the transmit signal is distorted and disturbed by noise; in GSM, for example, the distortions are caused by multipath propagation and intersymbol interference of the modulation method. Thus, special measures for recovering the transmitted data from the received signal are necessary in the receiver i.e. an equalization method is to be used. As channel coding is often used for increasing the resistance to noise in digital transmission (for example, convolutional coding in GSM), the data estimated by the equalizer are still to be decoded. It is then advantageous when the decoder is not only supplied with estimates of the coded data, but also with reliability information (also termed Soft-Output information (SO information)) by the equalizer, which information indicates with what reliability the data were decided in trellis-based reduced-state equalization methods, which may also be used for equalizing long impulse responses having moderate complexity, the supplied soft-output information may differ considerably from the actual values, which has a degrading effect on the subsequent decoding.

A Pulse Amplitude Modulation (PAM) transmission over a distorting channel that generates Inter-Symbol Interference (ISI), may be modeled in a discrete-time version in an equivalent low-pass range, as is shown in the left-hand part of FIG. 1. The sampled received signal r(k) occurs as a noise-affected convolution of the PAM transmit sequence a(k) having the channel impulse response h(k), whose length is referenced L:

$$r(k) = \sum_{\kappa=0}^{L-1} h(\kappa)a(k - \kappa) + n(k), \quad (1)$$

where n(k) represents the discrete-time noise which is assumed to be white noise and is a given fact prior to the sampling when a whitened matched filter is used as a continuous-time receiver input filter. Depending on the modulation method used, the amplitude coefficients and the channel impulse response are either real or complex.

The optimum equalization method with minimum error probability, Maximum Likelihood Sequence Estimation (MLSE), is known from G.D. Forney, "Maximum likelihood sequence estimation of digital sequences in the presence of intersymbol interference", IEEE Transactions on Information Theory, vol. IT-18, 1972, pp. 363–378. There was more particularly shown here that MLSE may be implemented efficiently with the Viterbi Algorithm (VA). However, for long impulse responses h(k), even the VA is hard to realize, because the trellis diagram which is to be made with the VA has $Z=ML^{L-1}$ states per time period with M-stage amplitude coefficients, thus the complexity of VA exponentially increases with the length of the discrete-time impulse response. When the number of subsequent symbols affected by a transmitted symbol becomes too large, more cost-effective, ie reduced-state, equalization methods are to be used because of the limited available computing speed.

Furthermore, it is known that first a pre-equalization, ie shortening, of the channel impulse response is to be made by means of decision feedback equalization (DFE). Then either the DFE itself is to make preliminary threshold decisions, or preliminary hard-decision symbols ($â_{HDF}$) of the next Viterbi equalizer are fed to the DFE, which in both cases leads to a noticeable degradation due to error propagation.

Furthermore, the impulse response for each state of the equalizer may be shortened by a state-dependent (private) DFE, instead of a state-independent (common) DFE for all the states. The trellis-based algorithm then provides that only the first part of the impulse response having length R+1, with $1 \leq R+1 \leq L$, is equalized. Thus the branch metrics are computed for state transitions in the time interval k from a (reduced) state $S^{(r)}(k)=(ã(k-1)ã(k-2) \ldots ã(k-R))$ to the (reduced) state $S^{(r)}(k+1)=(ã(k)ã(k-1) \ldots ã(k-R+1))$ (the coefficients $ã(k-\mu)$ indicate the data assumed in the specific state) with the aid of contents of path registers of the respective states. The registers contain hard-decision estimates $â_{HDF}(k-\mu, S^{(r)}(k))$, $R+1 \leq \mu \leq L-1$ of the previous data symbols in the path leading to the state $S^{(r)}(k)$, which estimates are to be updated in each time period. Thus the branch metric becomes $$\lambda_{S^{(r)}(k) \to S^{(r)}(k+1)} = \left| r(k) - \sum_{\mu=0}^{R} \hat{h}(\mu)ã(k - \mu) - \sum_{\mu=R+1}^{L-1} \hat{h}(\mu)â_{HDF}(k - \mu, S^{(r)}(k)) \right|^2, \quad (2)$$

where $\hat{h}(\mu)$, $0 \leq \mu \leq L-1$ which indicate the channel impulse response estimates available to the receiver.

This reduced-state estimation method will be referenced Decision-Feedback Sequence Estimation (DFSE) hereinafter. The states and transitions are no longer assigned unambiguously to a special combination of symbols in the channel memory, but there are henceforth ambiguities, as generally occurs in reduced-state methods, while particularly with DFSE the oldest symbols in the channel memory are taken into account only for preliminary-decision symbol values.

The efficiency of DFSE may be further improved by an upstream all-pass filter which transforms the impulse response into its minimum-phase equivalent. This transformation provides a concentration of the energy of the impulse response in the front part, while the discrete-time noise remains white noise as before. This property of the minimum phase total impulse response motivates an additional reduction of the complexity of the DFSE, in that only h(R+1), h(R+2), . . . , h(R'), R<R'<L-1 are taken into account by private DFEs $â_{HDF}(k-\mu, S^{(r)}(k))$, but the remaining part of the impulse response h(R'+1), . . . H(L-1) only by a single common DFE $â_{HDF}(k-\mu, k)$). If the last part of the impulse response contains only a small part of the total energy, the omission of the individual state relation (of the private DFEs) hardly reduces the efficiency of the estimation.

These methods produce only hard-decision estimates for the received symbols, without further information about with which certainty the individual decisions were made, ie how likely they are true. This soft-output (SO) information, referenced $\tilde{m}(k)$ here (the vector $\tilde{m}(k)$ has a degree of probability for all the transmit symbols a(k)), however, is necessary in many transmission systems for an additionally available channel coding to enhance the resistance to noise, as, in consequence, the results of the decoding can be considerably improved by this SO information after the equalization.

For determining the symbol probabilities $\tilde{m}(k)$ in block-oriented transmission, particularly an algorithm with a bidirectional recursion rule can be used. First a forward recursion is used for computing the probabilities $\alpha(k,S(k))$ for the states $S(k) \in \{1,2,\ldots,Z\}$ at step k, while the received signals considered thus far up to instant k−1 are taken into account. Then, a backward recursion is used for computing probabilities $\beta(k,S(k))$ for the received signals considered from the block end back to the step k with a presupposed state S(k) in the real step k. The state probabilities $\psi(k,S(k))$ for the states S(k) at step k are then the result of $$\psi(k,S(k))=\alpha(k,S(k))\cdot\beta(k,S(k)). \quad (3)$$

while the total received sequence is taken into account.

Since a finite-length impulse response channel generating ISI may always be interpreted as a trellis coder with a FIR structure, the a-posteriori probabilities of the input symbols are the direct result of the state probabilities. Since the bidirectional algorithm also works on the basis of a trellis, it may be a reduced-state one in similar manner to the Viterbi algorithm. For the forward recursion, for computing the $\alpha(k,S^{(r)}(k))$, each of the $M^R$ reduced states is assigned a path register for computing a metric, which path register may be updated in each time period. Two path metrics are stored and used once again for the backward recursion.

For the computation of the symbol probabilities $\tilde{m}(k)$ in a continuous transmission without block limits formed by trellis-terminated symbols, only a forward recursion, that is, unidirectional recursion, is used contrary to the bidirectional algorithm. Then, similarly to the bidirectional algorithm, state probabilities $\alpha(k,S(k))$ are computed. Since, finally, probabilities for the symbols a(k−D) are to be determined while the received signal is known up to instant k, a second recursion is necessary for determining state-related symbol probabilities $$\Pr\{a(k-\delta) \mid S(k+1), \langle r(v)\rangle_0^k\}, D \geq \delta \geq L.$$

With the results of the two recursions, the desired a-posteriori probabilities $$\Pr\{a(k-D) \mid \langle r(v)\rangle_0^k\}$$

can be determined. A state reduction may also be effected with the unidirectional algorithm. By forming overlapping blocks on the receiving side, the bidirectional algorithm may also be used for a continuous transmission. As a result of its smaller complexity, bidirectional algorithm is typically more suitable than the unidirectional algorithm.

For all the known trellis-based reduced-state equalization methods together, the fact is that the quality of the soft-output information $\tilde{m}(k)$ for a received symbol with a strong state reduction with hard-decision feedback values is insufficient.

OBJECTS AND SUMMARY OF THE INVENTION

It is an object of the invention to achieve, with a reduced number of states, optimum estimates for the received symbols via feedback.

With the subject according to the invention, the object is achieved in that the receiver forms the feedback value from at least one intermediate value. Contrary to known receivers, in which discrete-value estimates are fed back for state reduction, according to the invention it is also possible to use intermediate values for forming the feedback value, which intermediate values may adopt other values. In digital transmission systems, the transmit symbols and the estimates in the receiver have the values −1 or 1, for example. In the receiver according to the invention, also intermediate values having a value in the range from −1 to 1 can be fed back, so that a better feedback value and thus better estimates can be achieved for the received symbols.

In a further embodiment of the invention, the receiver forms soft-output information for at least one estimate for a received symbol. In the receiver, an estimation method may be used which produces soft-output information which indicates with what reliability the data were decided. In digital transmission, for example, for enhancing the resistance to noise, channel coding is often used (for example, convolutional coding in GSM), so that the next decoder is still to decode the estimated data. For this purpose, it is advantageous when the decoder is supplied with Soft-Output information in addition to estimates of the coded data, from which SO information the receiver forms the intermediate value in a preferred embodiment.

In an advantageous further embodiment, the receiver forms the soft-output information for a received symbol by means of optimum single-symbol estimation methods with a unidirectional or bidirectional recursion rule.

The SO information for a received symbol may further be formed by the receiver of the received symbol by means of simplified sub-optimum estimation methods. Whereas the, for example, unidirectional or bidirectional algorithms represent optimum methods for computing the symbol reliability, there are furthermore a plurality of simplified, sub-optimum methods which may be derived systematically from the two algorithms. A possible simplification is, for example, the use of additive path metrics which are updated by ACS operations (Add-Compare-Select), instead of reckoning with real probabilities for which multiplications are necessary. The pure VA may be modified for producing symbol reliabilities, which leads to SOVA (Soft-Output-VA). Sub-optimum methods may generally also be reduced-state as a result of decision feedback.

In a further embodiment, the receiver divides the feedback value into a first, common, component and into a second, private, component. The principle of the feedback according to the invention with an arbitrary division into private and/or common DFEs may also be combined with hard-decision feedback strategies. As a result, the feedback terms may be formed by up to four different components. For example, the energy distribution of the estimated impulse response may be used as a dividing criterion.

Furthermore, the object is achieved by a receiver and a method for receiving a digital signal.

These and other aspects of the invention will be apparent from and elucidated with reference to the embodiments described hereinafter.

DETAILED DESCRIPTION OF THE PREFERRED EMBODIMENTS

Figure 1:
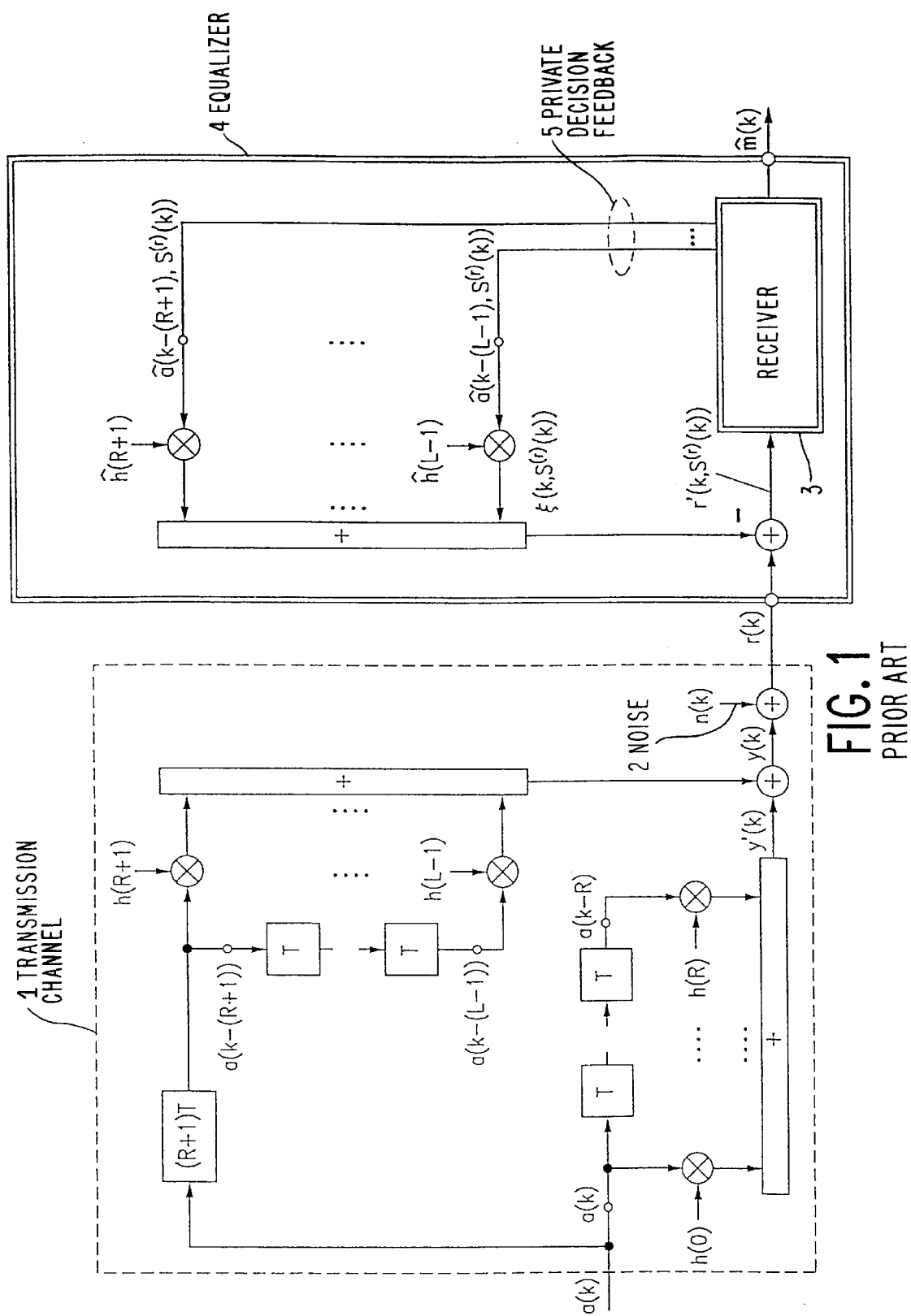
FIG. 1. shows a block circuit diagram for the procedure of the equalization of intersymbol interference with the aid of trellis-based reduced-state equalizers.

In FIG. 1 can be recognized in the left-hand part the channel 1 that generates intersymbol interference and noise 2. The right-hand part is the diagrammatic representation of an equalizer 4 with a reduced-state trellis-based estimation method 3 having a private decision feedback 5.

Common to all the known trellis-based reduced-state equalization methods 3 is the fact that the quality of the soft-output information $_m(k)$ for a received symbol with a strong state reduction and hard-decision feedback values is insufficient. Generally, for all the paths starting from a certain state, the influence of the pulse followers is taken into account for the computation of the associated path metrics in that the discrete-value symbols are fed back from the path history, which discrete-value symbols are taken from the available symbol alphabet. Thus there are always hard decisions relating to the feedback symbols available, as a consequence of which this procedure will be denoted Hard-Decision Feedback HDF in the following. The principle may be explained in FIG. 1 by feeding back (private) hard-decision symbol values $\hat{a}_{HDF}(k-\mu, S^{(r)}(k))$ 5. The channel model in this figure has already been slightly redrawn to indicate clearly that the component h(O) up to h(R) of the impulse response is taken into account by the trellis-based reduced-state algorithm 3 having $M^R$ states, and the remaining components h(R+1) to h(L−1) of the impulse response (the so-called pulse followers) are taken into account by a decision feedback 5, which may be different for each hyper state $S^{(r)}(k)$ in the most general case. The channel impulse response to be equalized h(k), however, has a total length of L just like before, despite the redrawing.

Since there is a separate path history for each hyper state, the overall value of the hard-decision feedback shown in FIG. 1 is $$\xi_{HDF}(k, S^{(r)}(k)) = \sum_{\mu=R+1}^{L-1} \hat{a}_{HDF}(k-\mu, S^{(r)}(k)) \cdot \hat{h}(\mu) \quad (4)$$

usually differing from one hyper state to another.

Figure 2:
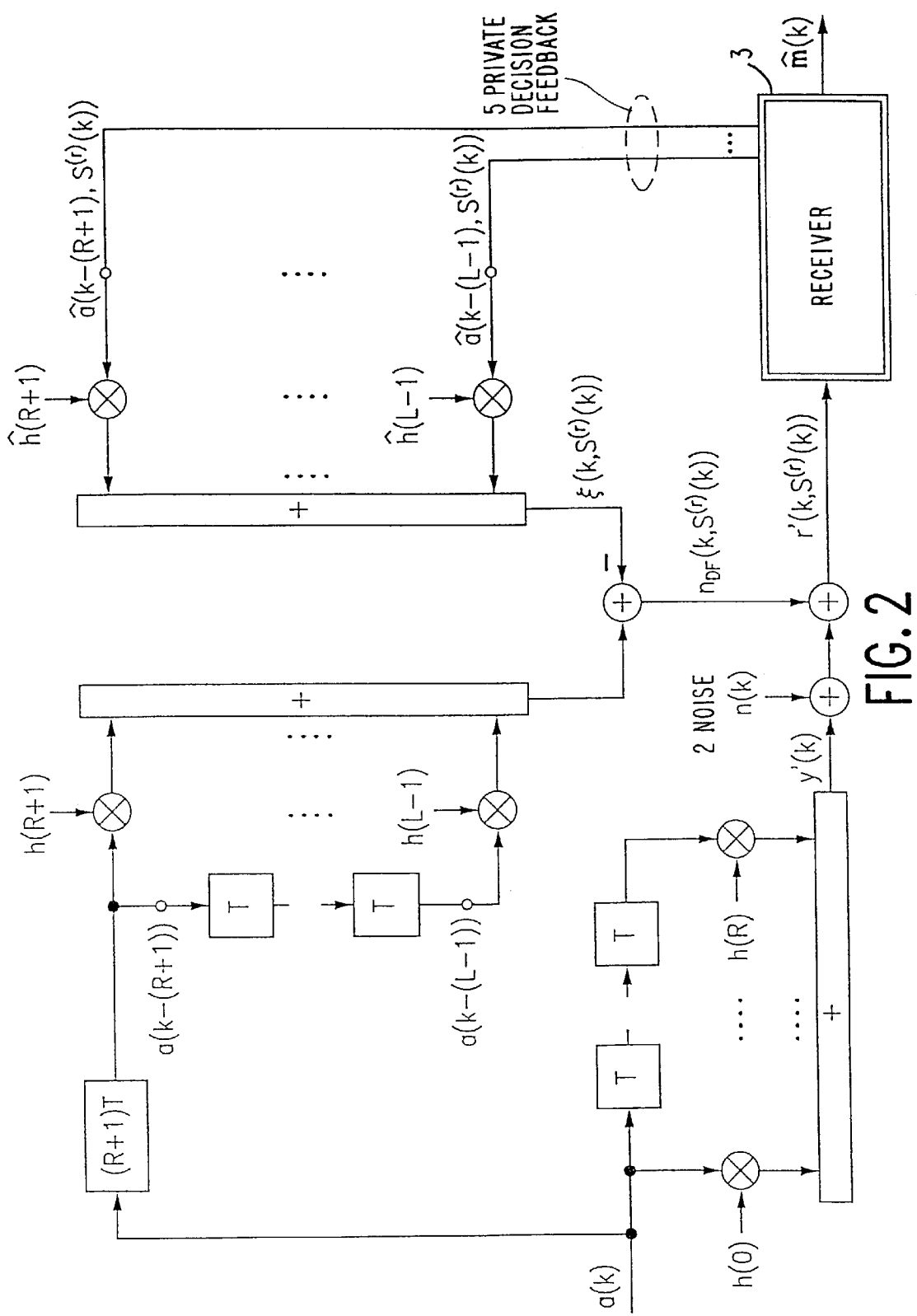
FIG. 2. shows a modified block circuit diagram for explaining the additional (private) noise term n evolving from decision feedback, and FIG. 3. shows a block circuit diagram when the decision feedback is split up into a private and a common component.

The block circuit diagram in FIG. 1 may be redrawn like in FIG. 2, to feature an additional noise term $n_{HDF}(k, S^{(r)}(k))$ which evolves from the feedback of false decisions from the respective path register of the equalizer. The noise term $n_{HDF}(k, S^{(r)}(k))$ is typically different from one state to another because each hyper state $S^{(r)}(k)$ may have typically different values $\hat{a}_{HDF}(k-\mu, S^{(r)}(k))$ for the symbols along the path leading to this state. For the errors caused by the hard-decision feedback in the hyper state $S^{(r)}(k)$ it holds that $$n_{HDF}(k, S^{(r)}(k)) = \sum_{\mu=R+1}^{L-1} a(k-\mu) \cdot h(\mu) - \quad (5)$$

$$\sum_{\mu=R+1}^{L-1} \hat{a}_{HDF}(k-\mu, S^{(r)}(k)) \cdot \hat{h}(\mu)$$

$$n_{HDF}(k, S^{(r)}(k)) = \sum_{\mu=R+1}^{L-1} a(k-\mu) \cdot h(\mu) - \xi_{HDF}(k, S^{(r)}(k))$$

Assuming that all the decisions relating to the feedback symbols are correct, it holds that (with ideal channel estimation) $n_{HDF}(k, S^{(r)}(k))=0$ and the known HDF methods produce high-quality SO values ($\hat{m}$) However, when the channel has small signal-to-noise ratios, the feedback symbol values cannot be assumed to be correct, so that additional noise is introduced into the system by the decision feedback, which degrades the quality of the SO. Also with strongly reduced-state SO equalization methods it appears that the SO value is clearly lower than with the method having a moderate state reduction, ie the produced estimates for the symbol error probabilities and the real values differ significantly, because the errors in the computation of the metric become too large because false symbols $\hat{a}_{HDF}(k-\mu, S^{(r)}(k))$ occur too frequently. This leads to an increased bit error rate after channel decoding.

The further embodiments describe the methods by means of their use for the equalization. The basic procedure, however, may also be extended to other trellis-coded signals. CPM signals may be interpreted as trellis-coded signals just like signals distorted by a channel. In CPM, impulse noise is intentionally inserted into the signal to compress the transmit spectrum. Thus, trellis-based estimation methods may be used for CPM in the same manner as for signals transmitted over dispersive channels, so that the subject of the invention may also be used for coded transmission with CPM.

In the described embodiment, a modified feedback term is used in the computation of the metric. A possibility is to choose the feedback term so that the average weight of the feedback error is minimized. Soft-decision feedback values $\hat{a}_{SDF}(k-\mu, S^{(r)}(k))$ are necessary for this purpose, which values are computed with this method. When the weight of the error is minimized, the knowledge about the current state $S^{(r)}(k)$ and about the received signal up to the instant k−1 is to be used. The result of a mathematical formula value can be minimized at any instant and for each state:

$$\varepsilon\{|n(k, S^{(r)}(k))|^2 \mid S^{(r)}(k), \langle r(v)\rangle_0^{k-1}\} = \min \quad (6)$$

The expression for the error weight is $$|n(k, S^{(r)}(k))|^2 = \left|\sum_{\mu=R+1}^{L-1} a(k-\mu) \cdot h(\mu) - \xi(k, S^{(r)}(k))\right|^2 \quad (7)$$

This expression for the squared error is used in the formation of the expected value according to (6) and derived from the total expression after the complex feedback. For finding the minimum value, the expression is set to zero.

$$\frac{\partial \varepsilon \{|n(k, S^{(r)}(k))|^2 \mid S^{(r)}(k), \langle r(v) \rangle_0^{k-1}\}}{\partial \xi(k, S^{(r)}(k))} = \quad (8)$$

$$\varepsilon \left\{ -\left[ \sum_{\mu=R+1}^{L-1} a(k-\mu) \cdot h(\mu) - \xi(k, S^{(r)}(k)) \right]^* \mid S^{(r)}(k), \langle r(v) \rangle_0^{k-1} \right\} = 0$$

This leads to $$\sum_{\mu=R+1}^{L-1} \varepsilon \{a(k-\mu) \cdot h(\mu) \mid S^{(r)}(k), \langle r(v) \rangle_0^{k-1}\} - \xi(k, S^{(r)}(k)) = 0 \quad (9)$$

and the value $$\xi_{SDF}(k, S^{(r)}(k)) = \sum_{\mu=R+1}^{L-1} \hat{h}(\mu) \cdot \varepsilon\{a(k-\mu) \mid S^{(r)}(k), \langle r(v) \rangle_0^{k-1}\} \quad (10)$$

is obtained with the aid of the estimated (expected) channel parameters $h(\mu)$ as the optimum soft-decision feedback value for minimum error weight for all the branches leaving the hyper state $S^{(r)}(k)$.

The actual result which is the optimum value for the respective single symbol that is fed back is found at $$\hat{a}_{SDF}(k-\mu, S^{(r)}(k)) = \varepsilon\{a(k-\mu) \mid S^{(r)}(k), \langle r(v) \rangle_0^{k-1}\} \quad (11)$$

$$\hat{a}_{SDF}(k-\mu, S^{(r)}(k)) = \sum_{m=0}^{M-1} \Pr\{a(k-\mu)$$

$$= A_m \mid S^{(r)}(k), \langle r(v) \rangle_0^{k-1}\} \cdot A_m$$

where $A_m, m \in \{0, 1, \ldots M-1\}$ denote the permitted amplitude coefficients from the symbol alphabet A of the M-stage transmission. The individual feedback values are formed according to the invention by weighted components of the discrete-values $A_m$ from the number A of the transmit symbols and are thus not exclusively selected from A, but have an analog range of values. Thus, soft-decision feedback values (SDF) are to be used for minimizing the error weight. For example, in binary transmission with $A_0=1$ and $A_1=-1$, it holds that $$-1 \leq \hat{a}_{SDF}(k-\mu, S^{(r)}(k)) \leq 1. \quad (12)$$

The state-dependent symbol probabilities $(_{\tilde{m}})$ necessary for the equation (11) can be computed with the respectively used trellis-based equalization method.

The necessary symbol probabilities used in equation (11) are already available anyhow as intermediate magnitudes in a reduced-state unidirectional algorithm, so that the use of soft-decision feedback values does not imply more circuitry and cost here.

For explaining the method of producing the soft-decision feedback values, a reduced-state version of the unidirectional algorithm will be outlined here as an embodiment. Approximate values $$\Pr\{a(k) = A_m \mid \langle r(v) \rangle_0^{k+D}\}, m \in \{0, \ldots, M-1\} \quad (13)$$

for the optimum soft-output information $\Pr\{\alpha(k) = A_m | < r(v) >\}$ for the symbols $a(k)$ are computed by means of the algorithm. The approximate value is, in the first place, the result of the reduction of states itself and is, in the second place, caused by the fact that only D received values $r(v)$ (thus only up to $v=k+D$) lying further in the future are evaluated. Thus, not the whole sequence of received values is used for determining the soft-output information for individual $a(k)$. But there may be assumed that for sufficiently large D the approximation is already very exact. The algorithm thus works continuously and gives, after decision delay D, the soft-output information resulting from the equation $$\Pr\{a(k-D) \mid \langle r(v) \rangle_0^k\} = \frac{p(a(k-D), \langle r(v) \rangle_0^k)}{\sum_{\forall \tilde{a}(k-D)} p(\tilde{a}(k-D), \langle r(v) \rangle_0^k)} \quad (14)$$

Here, the decision delay in the argument of the soft-output information produced in the time period k was taken into account for signal element $a(k-D)$ and the sequence of the received values up to instant k was assumed to be known.

The computation of the desired soft-output information to be read from the trellis-based algorithm presupposes the total distribution rate function in the numerator and denominator of (14), which function may again be computed with $$p(a(k-D), \langle r(v) \rangle_0^k) = \sum_{\forall S^{(r)}(k+1)} p(a(k-D), S^{(r)}(k+1), \quad (15)$$

$$\langle r(v) \rangle_0^k)$$

$$= \sum_{\forall S^{(r)}(k+1)} \Pr\{a(k-D) \mid S^{(r)}(k+1),$$

$$\langle r(v) \rangle_0^k\} \cdot p(S^{(r)}(k+1), \langle r(v) \rangle_0^k)$$

$$= \sum_{\forall S^{(r)}(k+1)} \Pr\{a(k-D) \mid S^{(r)}(k+1),$$

$$\langle r(v) \rangle_0^k\} \cdot \alpha(k+1, S^{(r)}(k+1))$$

In the last step, the contracted equation $$\alpha(k, S^{(r)}(k)) \doteq p(S^{(r)}(k), \langle r(v) \rangle_0^{k-1}) \quad (16)$$

was used for the total probability of $S^{(r)}(k)$ and partial receiving sequence $<r(v_0^{k-1})>$, for which reason this magnitude is to be denoted the state probability.

It should be observed that the second probability magnitude in (15) exactly corresponds to the value that is necessary for determining the soft-decision feedback and which value was denoted state-determined soft-output information $$\Pr\{a(k-\delta) \mid S^{(r)}(k), \langle r(v) \rangle_0^{k-1}\}.$$

This is a type of preliminary and state-dependent symbol probability for the symbol $a(k-\delta)$ under the condition that state $S^{(r)}(k)$ and the receiving sequence are observed only up to $r(k-1)$.

Consequently, the unidirectional algorithm can determine the desired soft-output information (corresponds to the symbol probability of $a(k-D)$) from the sum of products from state probability and state-determined symbol probability, while one recursion can be given for each of the two magnitudes (by approximation in the reduced-state case). The first recursion for the state probability may be given as $$\alpha(k+1, S^{(r)}(k+1)) \approx \sum_{S^{(r)}(k) \in V(S^{(r)}(k+1))} \alpha(k, S^{(r)}(k)) \cdot \quad (17)$$

$$\gamma(S^{(r)}(k), S^{(r)}(k+1))$$

where $V(S^{(r)}(k+1))$ represents all the states which are permitted predecessors of $S^{(r)}(k+1)$. In this equation, $\gamma(S^{(r)}(k), S^{(r)}(k+1))$ represents the branch probability for the transition (branch) from state $S^{(r)}(k)$ to $S^{(r)}(k+1)$ and can be expressed in Gaussian noise by the proportionality $$\gamma(S^{(r)}(k), S^{(r)}(k+1)) \sim \exp\left(-\frac{\lambda_{S^{(r)}(k) \to S^{(r)}(k+1)}}{2\sigma^2}\right) \quad (18)$$

(see (2)). $\sigma^2$ is the variance of the noise process.

The second recursion for the state-determined soft-output information may be found by computing $$\Pr\{a(k-\delta) \mid S^{(r)}(k+1), \langle r(v)\rangle_0^k\} \approx \quad (19)$$

$$\sum_{S^{(r)}(k) \in V(S^{(r)}(k+1))} \frac{[\Pr\{a(k-\delta) \mid S^{(r)}(k), \langle r(v)\rangle_0^{k-1}\} \cdot \alpha(k, S^{(r)}(k)) \cdot \gamma(S^{(r)}(k), S^{(r)}(k+1))]}{\alpha(k+1, S^{(r)}(k+1))}$$

This computation is to be made for all the $D \geq \delta \geq R+1$ and all the $a(k-\delta) \in A$, and also or each new state $S^{(r)}(k+1)$.

For the state-determined soft-output information to be entered of the symbols in the time period k, which do not take the state into account (thus $\delta = R$), the computation holds via $$\Pr\{a(k-R) \mid S^{(r)}(k+1), \langle r(v)\rangle_0^k\} = \quad (20)$$

$$\frac{\alpha(k, S(a(k-R)) \wedge V(S^{(r)}(k+1)) \cdot \gamma(S(a(k-R)) \wedge V(S^{(r)}(k+1)), S^{(r)}(k+1))}{\alpha(k+1, S^{(r)}(k+1))}$$

and this computation may also be made for each new hyper state and all the $a(k-\delta) \in A$. The set $$S(\alpha(k-R)) \doteq \{S^{(r)}(k) = (\alpha(k-1)\alpha(k-2) \ldots \alpha(k-R)) \mid \alpha(k-R) = \alpha(k-R)\} \quad (21)$$

was used, containing all the states which include the defined symbol $a(k-R)$ and the respective positions in time. Thus, $S(a(k-R)) \wedge V(S^{(r)}(k+1))$ is to represent the one state $S^{(r)}(k)$ that is the predecessor of $S^{(r)}(k+1)$ and contains the element $a(k-R)$. The magnitude $\gamma(S(a(k-R)) \wedge V(S^{(r)}(k+1)), S^{(r)}(k+1))$ is the probability for the branch that leads from this $S^{(r)}(k)$ to $S^{(r)}(k+1)$.

In this manner, all the magnitudes which are necessary for determining the soft-output information can be computed recursively.

In addition to the unidirectional algorithm, it is also possible to utilize the reduced-state bidirectional algorithm with soft-decision feedback. Since the forward recursion for determining the $\alpha(k,S(k))$ of the bidirectional algorithm at the same time forms an essential part of the unidirectional algorithm, this requires only moderate additional circuitry and cost, which consists of including the additional second recursion of the unidirectional algorithm, which recursion is necessary for determining the probabilities necessary for the soft-decision feedback. The length of the path register to be updated for this purpose is only L-1-R, because the unidirectional part of this combined algorithm is only necessary for decision feedback, but not for computing the symbol probabilities, which are computed by the bidirectional part. In contrast, a clearly more complex second forward recursion is necessary in the purely unidirectional algorithm, because an estimate delay of $D \approx 2L$ is necessary in minimum-phase channels for substantially fully registering the statistical relations.

The solution for $\xi_{SDF}(k,S^{(r)}(k))$ according to equation (10) with the minimum square error may only be considered one possibility from a large range of conceivable soft-decision feedback strategies. Especially with sub-optimum methods, the use of sub-optimum soft-decision feedback values presents itself, or is necessary, respectively.

Figure 3:
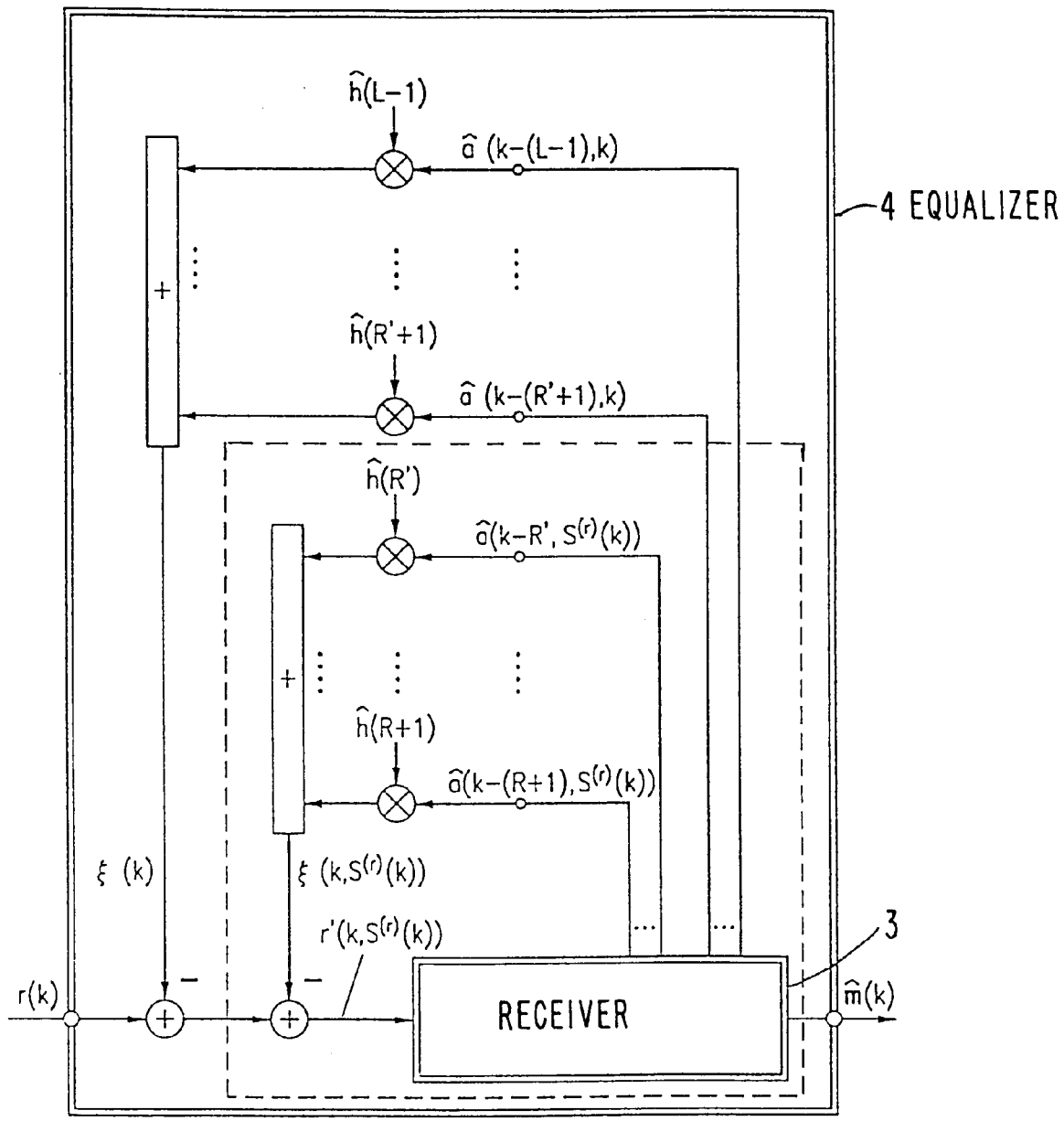

The principle already described of the subdivision of the decision feedback into private DFEs and one common DFE is also possible without further problems with soft-decision values with the two extreme cases of an exclusive use of the common DFE, or the exclusive use of private DFEs, respectively. The feedback term $$\xi_{SDF}(k, S^{(r)}(k)) = \sum_{\mu=R+1}^{R'} \hat{h}(\mu) \cdot \hat{a}_{SDF}(k-\mu, S^{(r)}(k)), \quad (22)$$

shown in FIG. 3, by which the first part of the pulse follower is taken into account in the computation of the metric, is formed individually for each state, while again state-dependent soft-decision symbol values are used. On the other hand, the feedback term $$\xi_{SDF}(k) = \sum_{\mu=R'+1}^{L-1} \hat{h}(\mu) \cdot \hat{a}_{SDF}(k-\mu, k) \quad (23)$$

which takes account of the last part of the pulse follower is identical in all cases, thus needs to be computed only once with common soft-decision symbols $\hat{a}_{SDF}(k-\mu,k)$. The principle of the soft-decision feedback with its arbitrary division into private and/or common DFEs may also be combined with hard-decision feedback strategies. In general, the feedback terms may be formed by up to four different portions: $\xi_{SDF}(k, S^{(r)}(k))$, $\xi_{HDF}(k, S^{(r)}(k))$, $\xi_{SDF}(k)$ and $\xi_{HDF}(k)$, where, for example, the energy distribution of the estimated impulse response $0 \leq \mu \leq L-1$ can be used as a dividing criterion.

When the SO values of the estimation method (for example, equalization method) whose quality has benefitted from the invention are subsequently utilized in a downstream decoder which is capable of processing soft-decision input information, the method according to the invention with the feedback of soft-decision symbol values provides a clear gain in the power efficiency of the digital transmission.

Furthermore, compared with the respective methods which use hard-decision feedback, the noise power additionally caused by decision feedback methods is reduced by about 1 dB due to the estimation of the minimum mean square error.

What is claimed is:

1. A receiver which receives from a transmission system symbols including a transmission system noise of said transmission system comprising:
   an estimator which forms estimated signals for said received symbols using an estimated impulse response of said transmission system; and a feedback loop for providing a feedback value to reduce a number of states of said estimator;

said feedback value being formed from said estimated signals and being combined with a portion of said received symbols to form a noise signal which is in addition to said transmission system noise, wherein said noise signal is combined with said received symbols for input to said estimator.

2. The receiver of claim 1, wherein said estimator is an optimum single-symbol estimator with a unidirectional or bidirectional recursion rule.

3. A digital transmission system having a receiver which receives symbols including a transmission system noise of said digital transmission system, said receiver comprising:

an estimator which forms estimated signals for said received symbols using an estimated impulse response of said transmission system; and a feedback loop for providing a feedback value to reduce a number of states of said estimator;

said feedback value being formed from said estimated signals and being combined with a portion of said received symbols to form a noise signal which is in addition to said transmission system noise, wherein said noise signal is combined with said received symbols for input to said estimator.

4. The digital transmission system of claim 3, wherein said estimator is an optimum single-symbol estimator with a unidirectional or bidirectional recursion rule.

5. A method for receiving from a transmission system symbols including a transmission system noise of said transmission system comprising:

estimating said symbols using an estimator to form estimated signals using an estimated impulse response of said transmission system;

forming a feedback value from said estimated signals;

forming a noise signal by combining said feedback value with a portion of said symbols; and feeding back said noise signal to an input of said estimator, wherein said noise signal is in addition to said transmission system noise of said transmission system.

* * * * *